United States Patent [19]

Lagakos et al.

[11] 4,427,263
[45] Jan. 24, 1984

[54] PRESSURE INSENSITIVE OPTICAL FIBER

[75] Inventors: Nicholas Lagakos, Silver Spring, Md.; Joseph A. Bucaro, Herndon, Va.

[73] Assignee: The United States of America as represented by the Secretary of the Navy, Washington, D.C.

[21] Appl. No.: 256,289

[22] Filed: Apr. 23, 1981

[51] Int. Cl.³ .............................................. G02B 5/172
[52] U.S. Cl. ............................. 350/96.33; 350/96.29; 350/96.34
[58] Field of Search ............... 350/96.23, 96.29, 96.30, 350/96.31, 96.33, 96.34; 367/140, 141; 73/655

[56] References Cited

U.S. PATENT DOCUMENTS

| | | | |
|---|---|---|---|
| 3,980,390 | 9/1976 | Yamamoto et al. | 350/96.33 |
| 4,000,936 | 1/1977 | Gloge | 350/96.23 |
| 4,076,382 | 2/1978 | Oestreich | 350/96.23 |
| 4,089,585 | 5/1978 | Slaughter et al. | 350/96.23 |
| 4,105,284 | 8/1978 | Olshansky | 350/96.33 |
| 4,114,981 | 9/1978 | Ishida et al. | 350/96.33 |
| 4,162,397 | 7/1979 | Bucaro et al. | 350/96.29 X |
| 4,243,298 | 1/1981 | Kao et al. | 350/96.33 |
| 4,334,733 | 6/1982 | Takeshima et al. | 350/96.33 |

FOREIGN PATENT DOCUMENTS

1524316 9/1978 United Kingdom ............. 350/96.33

OTHER PUBLICATIONS

Almeida et al., "On Line-Metal Coating of Optical Fibres," *Optik*, vol. 53, No. 3, Jun. 1979, pp. 231-233.

*Primary Examiner*—John D. Lee
*Attorney, Agent, or Firm*—Robert F. Beers; William T. Ellis; Kenneth E. Walden

[57] ABSTRACT

An optical fiber waveguide is rendered pressure insensitive by concentrically surrounding it with a substrate of high bulk modulus material having a wall of selected thickness whereby acoustic pressures (e.g. hydrostatic) on the waveguide induce phase change cancellations such that the algebraic sum of $\epsilon_z{}^P + \epsilon_r{}^P + \epsilon_z{}^l = 0$.

16 Claims, 8 Drawing Figures

PRESSURE INSENSITIVE OPTICAL FIBER

BACKGROUND OF THE INVENTION

Minimizing pressure sensitivity of optical fibers is important where they are used as leads to sensors and as reference fibers. In optical fiber acoustic sensors it is desirable to localize the fiber sensitivity by making the lead optical fibers pressure insensitive. In other optical fiber sensors (e.g. magnetic, and temperature), it is desirable to desensitize the fiber including even the sensing area to acoustic wave pressures because such acts as a noise source. It is important to localize the fiber's sensitivity to a desired area.

Sensitivity of an optical fiber waveguide is governed by elastic and elasto-optic coefficient of the optical fiber, the elastic coefficient of the coating and the thickness of the various layers. There are combinations of glass and coating materials and corresponding thicknesses which make optical fiber waveguides pressure insensitive. Generally, as the bulk modulus of the coating material increases, the sensitivity of the optical fiber decreases. There are disclosed combinations of glass and buffer materials and thicknesses which result in near zero pressure sensitivity. The pressure sensitivity of the optical phase in a fiber is defined as the magnitude of $\Delta\phi/\phi\Delta P$, where $\Delta\phi$ is the shift in the phase delay $\phi$ due to a pressure change $\Delta P$. If a given pressure change, $\Delta P$, results in a fiber core axial strain $\epsilon_z$ and radial strain $\epsilon_r$, then it can be shown that $$\frac{\Delta\phi}{\phi} = \epsilon_z - \frac{n^2}{2}[(P_{11} + P_{12})\epsilon_r + P_{12}\epsilon_z] \quad (1)$$

Here $P_{11}$ and $P_{12}$ are the elasto-optic or Pockels coefficients of the core and n is the refractive index of the core. The first term in Eq. (1) is the part of $\Delta\phi/\phi\Delta P$ which is due to the fiber length change, while the second and third terms are the parts due to the refractive index modulation of the core, which is related to the photo-elastic effect. Stated another way $\Delta\phi/\phi\Delta P$ = the algebraic sum of the phase change due to the fiber length change plus phase change due to refractive index change. The objective is to have $\Delta\phi/\phi\Delta P = 0$. When $\Delta\phi/\phi\Delta P$ is zero the fiber is insensitive.

A typical optical fiber (FIG. 2a) is composed of a core, cladding, and a substrate from glasses having similar properties. This glass fiber is usually coated with a soft rubber and then with a hard plastic. In order to calculate the sensitivity as given in Eq. (1) the strains in the core $\epsilon_z$ and $\epsilon_r$ must be related to properties of the various layers of the fiber. The pressure sensitivity of a fiber with one layer or two layers has already been reported. In the present analysis we have taken into account the exact geometry of a typical four layer fiber, as shown in FIG. 2a.

The polar stresses $\sigma_r$, $\sigma_\theta$, and $\sigma_z$ in the fiber are related to the strains $\epsilon_r$, $\epsilon_\theta$, and $\epsilon_z$ as follows:

$$\begin{bmatrix} \sigma_r^i \\ \sigma_\theta^i \\ \sigma_z^i \end{bmatrix} = \begin{bmatrix} (\lambda^i + 2\mu^i) & \lambda^i & \lambda^i \\ \lambda^i & (\lambda^i + 2\mu^i) & \lambda^i \\ \lambda^i & \lambda^i & (\lambda^i + 2\mu^i) \end{bmatrix} \begin{bmatrix} \epsilon_r^i \\ \epsilon_\theta^i \\ \epsilon_z^i \end{bmatrix} \quad (2)$$

where i is the layer index, (0 for the core, 1 for the cladding, etc.) and $\lambda^i$ and $\mu^i$ are the Lame parameters which are related to the Young's modulus, $E^i$, and Poisson's ratio, $\nu^i$, as follows:

$$\lambda^i = \frac{\nu^i E^i}{(1+\nu^i)(1-2\nu^i)}, \quad \mu^i = \frac{E^i}{2(1+\nu^i)} \quad (3)$$

For a cylinder the strains can be obtained from the Lame solutions $$\epsilon_r^i = U_o^i + \frac{U_1^i}{r^2}$$

$$\epsilon_\theta^i = U_o^i - \frac{U_1^i}{r^2} \quad (4)$$

$$\epsilon_z^i = W_o^i$$

where $U_o^i$, $U_1^i$ and $W_o^i$ are constants to be determined. Since the strains must be finite at the center of the core, $U_1^0 = 0$.

For a fiber with m layers, the constants $U_o^i$, $U_1^i$, and $W_o^i$ in Eq. (4) are determined from the boundary conditions:

$$\sigma_r^i|_{r=r_i} = \sigma_r^{i+1}|_{r=r_i}, (i = 0, 1, \ldots, m-1) \quad (5)$$

$$u_r^i|_{r=r_i} = u_r^{i+1}|_{r=r_i}, (i = 0, 1, \ldots, m-1) \quad (6)$$

$$\sigma_r^m|_{r=r_m} = -P, \quad (7)$$

$$\sum_{i=0}^{m} \sigma_z^i A_i = -PA_m \quad (8)$$

$$\epsilon_z^0 = \epsilon_z^1 = \ldots = \epsilon_z^m \quad (9)$$

where $u_r^i (= \int \epsilon_r^i dr)$ is the radial displacement in the $i^{th}$ layer, and $r_i$ and $A_i$ are the radius and the cross section area of the $i^{th}$ layer, respectively. Equations (5) and (6) describe the radial stress and displacement continuity across the boundaries of the layers. Equations (7) and (8) assume that the applied pressure is hydrostatic. Equation (9) is the plane strain approximation which ignores end effects. For long thin cylinders, such as fibers, it introduces an error of less than 1%. Using the boundary conditions described by Eqs. (5)–(9), the constants $U_o^i$, $U_1^i$, and $W_o^i$ are determined and $\epsilon_r^0$ and $\epsilon_z^0$ are calculated from Eq. (4). Then, from Eq. (1) the sensitivity, $\Delta\phi/\phi\Delta P$, can be found.

Numerous approaches have been taken in the past to provide optical fiber waveguides with coatings either to protect them physically during manufacturing and handling to prevent damage, or to buffer the fiber and isolate it from external forces which would cause signal attenuation. These have included protective coatings of rubber, soft and hard plastics and even metals in various combinations. Aluminum coatings have been utilized for sealing fibers hermetically to preserve their strength, but not to desensitize. Some of the disadvantages of such an arrangement are: (1) The metals have substantially higher thermal expansion coefficient than glass, and therefore, metal coating of glass fibers at high temperature is not possible without causing damage to the glass. Morever, environmental temperature changes induce significant microbending loses in the optical fiber which have been coated with a thick metal jacket. (2) Metals behave elastically over only a limited range of strains and inelastically therebeyond to cause significant microbending loses. (3) Metals exhibit dynamic fatigue when they experience rapidly varying pressures.

SUMMARY OF THE INVENTION

This invention relates to a pressure insensitive optical fiber waveguide for use as leads to and reference fibers in instrumentation that is to be desensitized to environmental cyclic or varying acoustic pressures (usually hydrostatic). More specifically, the invention provides for coating an optical fiber (core and cladding) of low bulk modulus with a substrate of high bulk modulus of selected thickness for a resultant no phase change in light passing through the optical core due to the acoustic pressure changes. The substrate may be further jacketed by combinations of relatively low bulk modulus coatings to protect the optical fiber from mechanical or structural damage.

OBJECTS OF THE INVENTION

It is therefore an object of the invention to provide a pressure insensitive optical fiber waveguide.

It is another object of the invention to provide an optical fiber waveguide with a concentric sleeve substrate of selected high bulk modulus and wall thickness to render the optical fiber waveguide insensitive to acoustic pressures.

It is still another object of the invention to provide an optical fiber waveguide with a surrounding sleeve substrate of selected high bulk modulus and wall thickness so as to induce cancelling phase shift effects normally induced by acoustic pressure on the waveguide.

It is yet another object of this invention to provide a pressure insensitive optical fiber waveguide for use as a lead to instrumentation to be sensitized from environmental pressures in which it is exposed.

Other objects of this invention will become apparent to one upon obtaining an understanding of the apparatus as described in the specification and claims herein.

DETAILED DESCRIPTION

Figure 1:
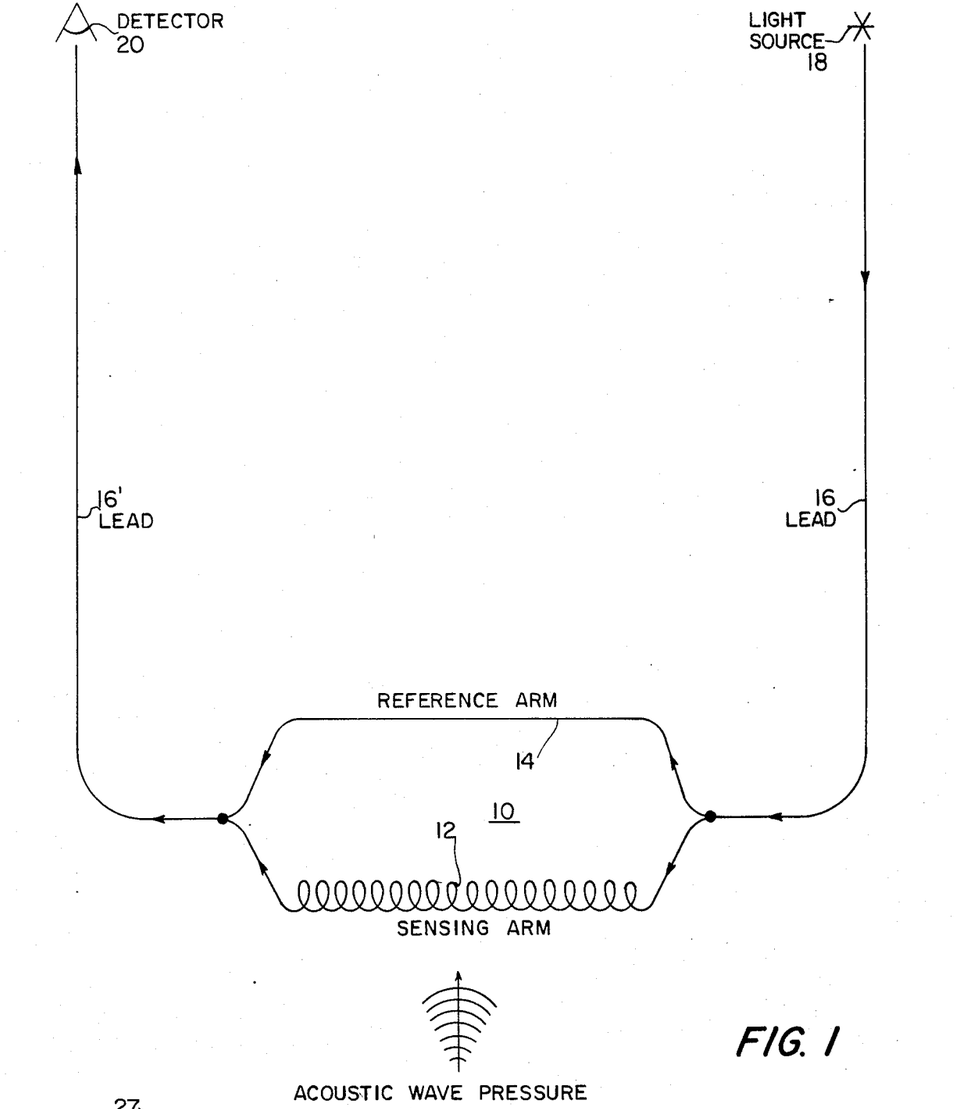
FIG. 1 shows a Mach-Zehnder optical fiber interferometer and leads thereto for sensing external acoustic pressure.

FIG. 1 shows apparatus in the form of a Mach-Zehnder optical fiber interferometer 10 for sensing acoustic wave pressure, magnetic field and temperature changes. Optical fibers 12 and 14, making up the sensing and reference arms, respectively, are relatively short lines, usually just a few meters or less. The sensing arm is obviously exposed to the environment for encountering the conditions it is designed to sense. The reference arm may be isolated or shielded by the environment (means not illustrated) or since it is relatively short, it may be exposed to the environment along with the sensing arm. This, of course, depends upon its type of service. Optical fiber waveguide leads 16 and 16' on the other hand may be as long as one or more kilometers, again depending upon the type of service.

The optical fiber interferometer performs in the usual manner. A light source 18 introduces light into lead optical fiber 16 where it travels and is subsequently divided to enter parallel arms 12 and 14. The light passes through the arms where a relative phase shift is induced in the sensing arm by a condition such as a magnetic field or acoustic wave. The light is then recombined and passed through lead 16' back to detector 20 where the extent of induced phase shifts is detected and converted into a meaningful reading which is in proportion to the magnitude of the conditions causing the phase shift.

Long lead lines are particularly sensitive to acoustic pressure, and this results in noise which interferes with the main function of the interferometer sensor for detecting a particular condition. The present invention is directed to providing optical fiber waveguide leads 16 and 16' insensitive to varying acoustic pressure, thereby desensitizing the interferometer section from its environment.

The sensitivity of an optical fiber is related to a combined effects of pressure induced fiber length changes (optical path length changes) and strain induced index of refraction change. These effects are generally of opposite polarity, and pressure insensitivity in the fiber can be obtained by balancing these effects one against the other. This is made possible, according to the invention disclosed herein, by providing a glass optical fiber (core and cladding), having a relatively low bulk modulus, with a glass substrate having a relatively high bulk modulus. The substrate can then be jacketed in several ways which will be discussed hereinafter.

Figure 2:
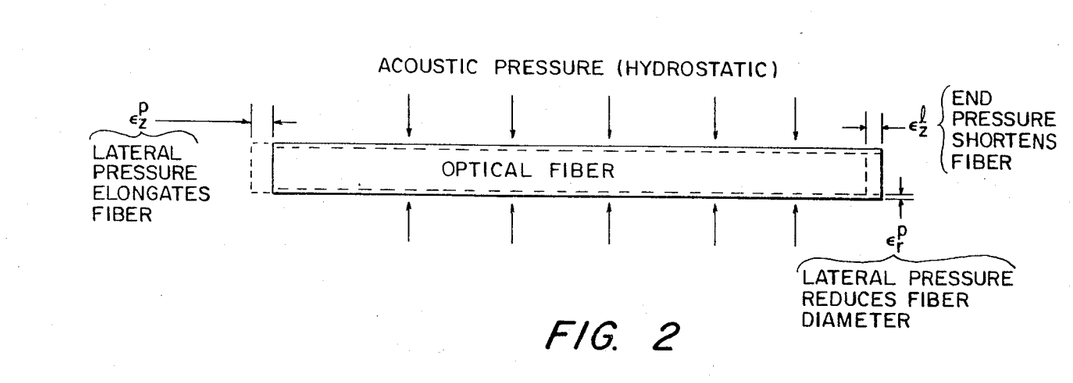
FIG. 2 shows an optical fiber with illustrated acoustic pressures which induce phase shifts.
Figure 2A:
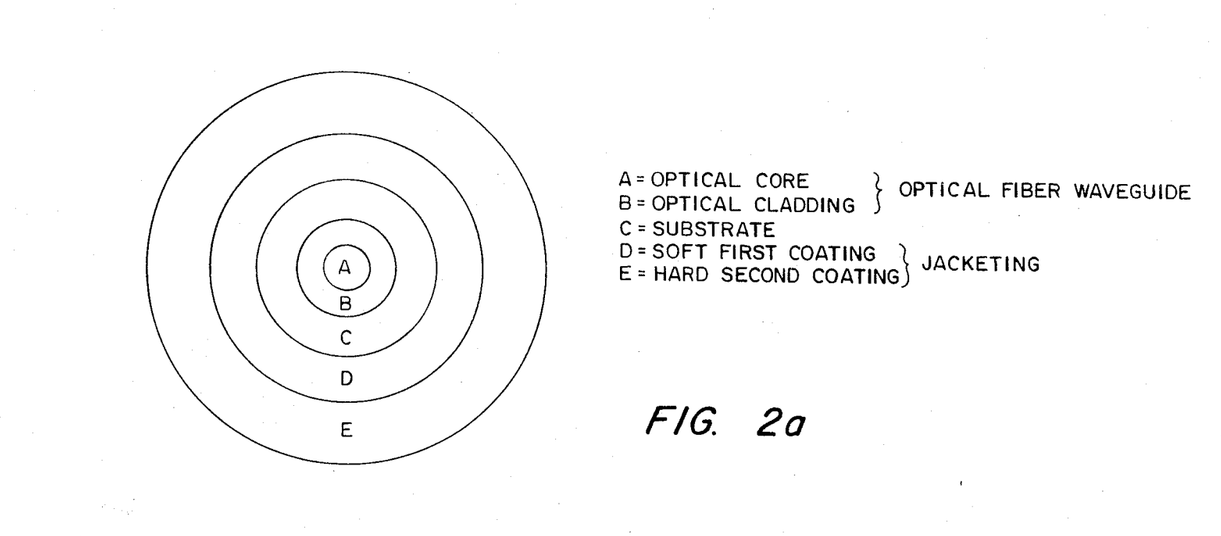
FIG. 2a is a cross-sectional view of one of the leads prepared according to the invention.

FIG. 2 is a representation of an optical fiber in an acoustic condition wherein pressures thereon cause dimension changes which result in both changes in optical path length and changes in the refractive index as previously explained under "Background of the Invention" heading.

FIG. 2a is a cross-sectional representation of an optical fiber waveguide rendered pressure insensitive by a substrate and jacketing. It comprises a glass optical core A, having excellent light transmission qualities, with relatively low bulk modulus, and a glass cladding B, with good optical properties and with a refractive index slightly lower than that of the optical core. Together they define an optical fiber waveguide. Substrate C is provided to have a high bulk modulus. The substrate is preferably jacketed first with a soft coating D of rubber or plastic and then with a hard plastic coating E. The glass used for core A, cladding B and substrate C preferably have similar thermal expansion coefficients and softening temperatures. There are a number of possible combination of glass materials with related thicknesses which can be used to achieve pressure insensitive fibers. The FIG. 2a embodiment is based either on Table I or Table II data, but the substrate may be substituted for the soft first coating as will be described hereinafter.

Figure 3:
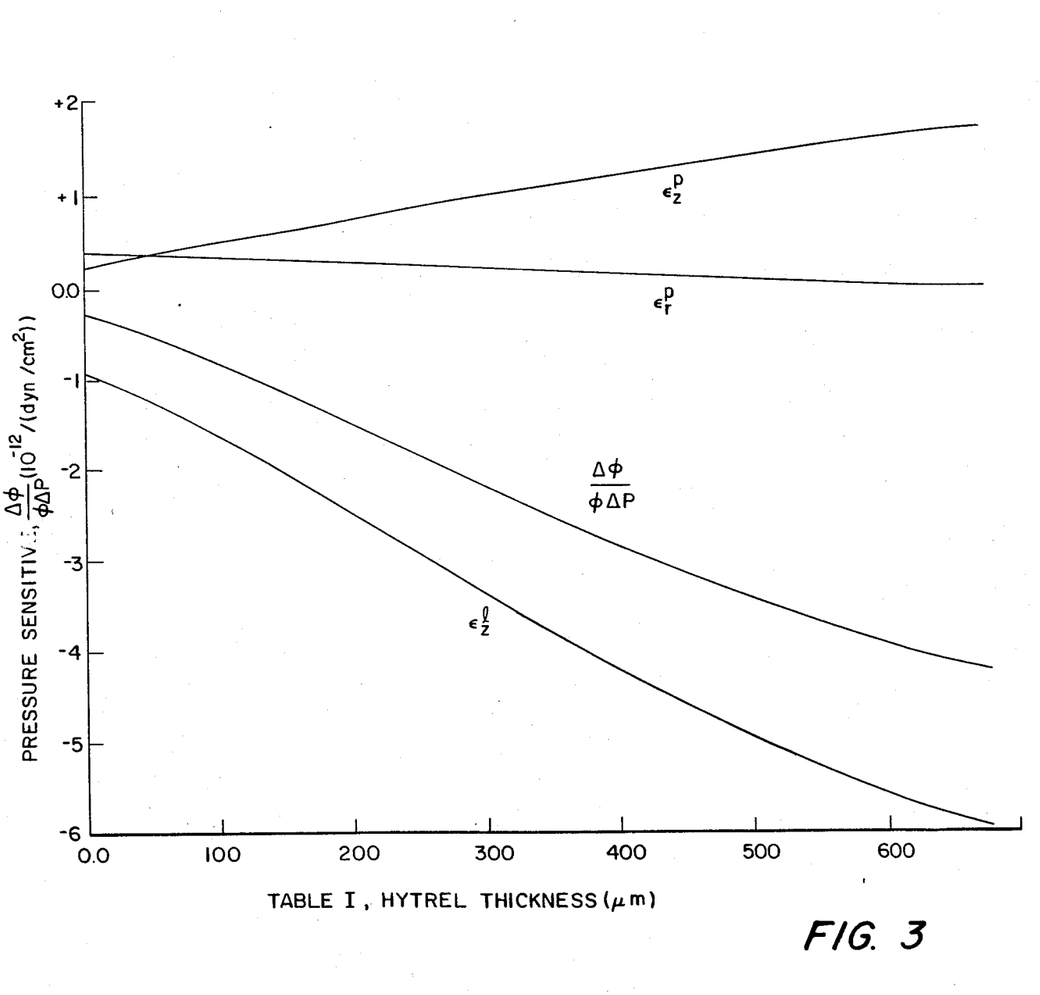
FIG. 3 shows pressure sensitivity of a commercially available optical fiber waveguide versus coating thickness.

FIG. 3 shows the pressure sensitivity of a typical commercially available (ITT) single mode fiber as a function of the plastic coating (sold by DuPont under the trademark "Hytrel") thickness, which usually varies in fibers. The fiber is nominally composed of a fused silica core with traces of $GeO_2$, a cladding of 5% $B_2O_3 + 95\%$ $SiO_2$, and a fused silica substrate. The fiber jacket consists of a 67.5 μm thick first coating of silicone and a 230 μm thick second coating of "Hytrel". The acoustic response of this fiber has been studied both experimentally and analytically in some detail. Table I lists all the parameters used to calculate the sensitivity, $\Delta\phi/\phi\Delta P$, of this fiber. From FIG. 3 it is seen that the largest contribution, $\epsilon_z^l$, is the part of $\Delta\phi/\phi\Delta P$, due to the fiber length change or optical path length change (first term in Eq. (1)). The $\epsilon_r^P$ and $\epsilon_z^P$ terms (the last two terms in Eq. (1)) are due to the photo-elastic effect which changes the refractive index, and they give smaller contributions of opposite polarity. As the "Hytrel" thickness increases (FIG. 3), the magnitude of the pressure sensitivity ($\Delta\phi/\phi\Delta P$) increases rapidly due primarily to the $\epsilon_z^l$ change.

TABLE I
Pressure Sensitivity of Commercial (ITT) Fiber

| | Optical Core | Optical Cladding | Substrate | First Coating (Soft) | Second Coating (Hard) |
|---|---|---|---|---|---|
| Composition | $SiO_2$ + traces of $GeO_2$ (0.1%) | 95% $SiO_2$ 5% $B_2O_3$ | $SiO_2$ | Silicone | "Hytrel" |
| Diameter (μm) | 4.5 | 30 | 85 | 220 | 450 |
| Young's Modulus ($10^{10}$ dyn/cm$^2$) | 72.45 | 64.14 | 72.45 | 0.0035 | 0.39 |
| Poisson's Ratio | 0.17 | 0.149 | 0.17 | 0.49947 | 0.483 |
| $P_{11}$ | 0.126 | | | | |
| $P_{12}$ | 0.27 | | | | |
| n | 1.458 | | | | |

$\frac{\Delta\phi}{\phi\Delta P} = -0.9 \times 10^{-12}/(dyn/cm^2)$

TABLE II
Pressure Insensitive Fiber According to Present Invention

| | Optical Core | Optical Cladding | Substrate | First (soft) Coating | Second (hard) Coating |
|---|---|---|---|---|---|
| Composition | $K_2O$-$SiO_2$ 12-88 (Mole %) | $K_2O$-$SiO_2$ 10-90 (Mole %) | Calcium Aluminate (NBS, D-308 Glass) (weight %) CaO: 25.3 $Al_2O_3$: 27.6 MgO: 2.9 BeO: 5.9 $ZrO_2$: 5.9 $SiO_2$: 14.7 $Ta_2O_3$: 5.9 $La_2O_3$: 5.9 $TiO_2$: 5.9 | Silicone | "Hytrel" |
| Diameter (μm) | 5 | 30 | 120 | 200 | 266 |
| Young's Modulus ($10^{10}$ dyn/cm$^2$) | 54 | 57 | 126.9 | 0.0035 | 0.39 |
| Poisson's Ratio | 0.201 | 0.188 | 0.275 | 0.49947 | 0.483 |
| Thermal Expansion Coefficient ($10^{-7}$/°C) | 70 | 61 | 67 | | |
| Softening Temperature (°C) | 722 | 772 | 790 | | |
| Refractive Index | 1.480 | 1.475 | | | |
| $P_{11}$ | 0.1515 | | | | |
| $P_{12}$ | 0.2476 | | | | |

$\frac{\Delta\phi}{\phi\Delta P} = 0$

The sensitivity of an optical fiber is related to the combined effects of pressure induced fiber length changes and strain induced index of refraction effects. These effects are generally of opposite polarity (FIG. 3). Accordingly, pressure insensitivity can be achieved by balancing these effects. In particular, it is possible to achieve this by designing fibers consisting of a glass core with a relatively low bulk modulus, and a glass substrate with a high bulk modulus. The substrate can then be coated in the usual way, first with a soft rubber and then with a hard plastic.

Figure 4:
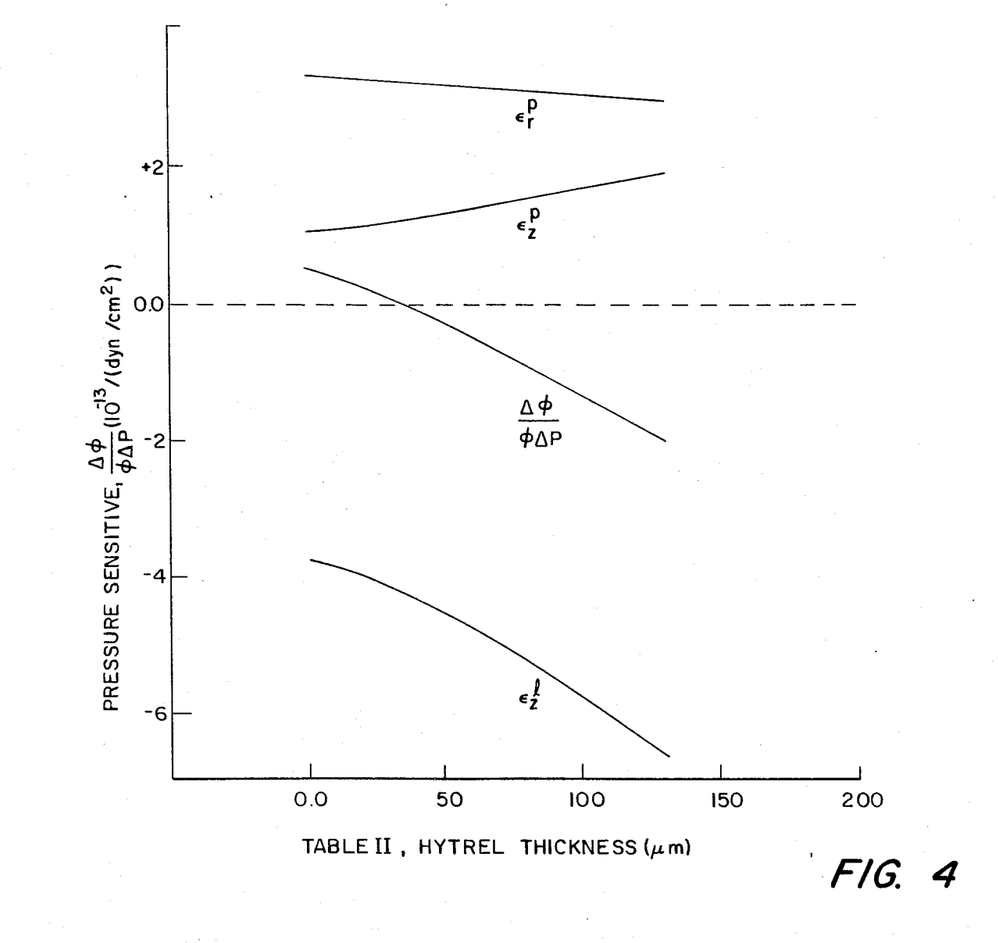
FIG. 4 shows pressure sensitivity of an optical fiber according to Table II versus thickness of one of the coating.

FIG. 4 shows the results of tests done on an optical fiber waveguide formed according to FIG. 2a with the composition, geometry, elastic and optical properties listed in Table II. The core and optical cladding both consist of a $K_2O$-$SiO_2$ glass with slightly different molar ratios in order to obtain the refractive index difference needed for an optical fiber. The low bulk modulus $K_2O$-$SiO_2$ glass has been found to have light transmission as good as fused silica. The substrate glass is a calcium aluminate glass (National Bureau of Standards D-308), NBS Report No. 5188, 1957), one of the many different glass compositions with high bulk modulus. The substrate is coated with silicon (first coating) and then with "Hytrel" (second coating), in order to protect the fiber.

FIG. 4 shows the pressure sensitivity of the optical fiber waveguide like that illustrated in FIG. 2a with parameters of Table II as a function of "Hytrel" thickness. As shown, the waveguide sensitivity becomes negative as the "Hytrel" thickness increases. With a "Hytrel" thickness of 33 microns the sensitivity line crosses zero and the waveguide becomes insensitive.

A pressure insensitive optical fiber waveguide can be achieved by applying a high bulk modulus glass substrate (e.g. calcium aluminate) or metal (e.g. nickel) as one of the coatings to commercially available fibers with core cladding and substrate characteristics identified in Table I. These high silica fibers can be made pressure insensitive by coating the silica substrate first with a high bulk modulus glass substrate (e.g., calcium aluminate) followed by "Hytrel" as the second or outer coating. In other words, calcium aluminate is substituted for the silicon soft coating D illustrated in FIG. 2a.

Figure 5:
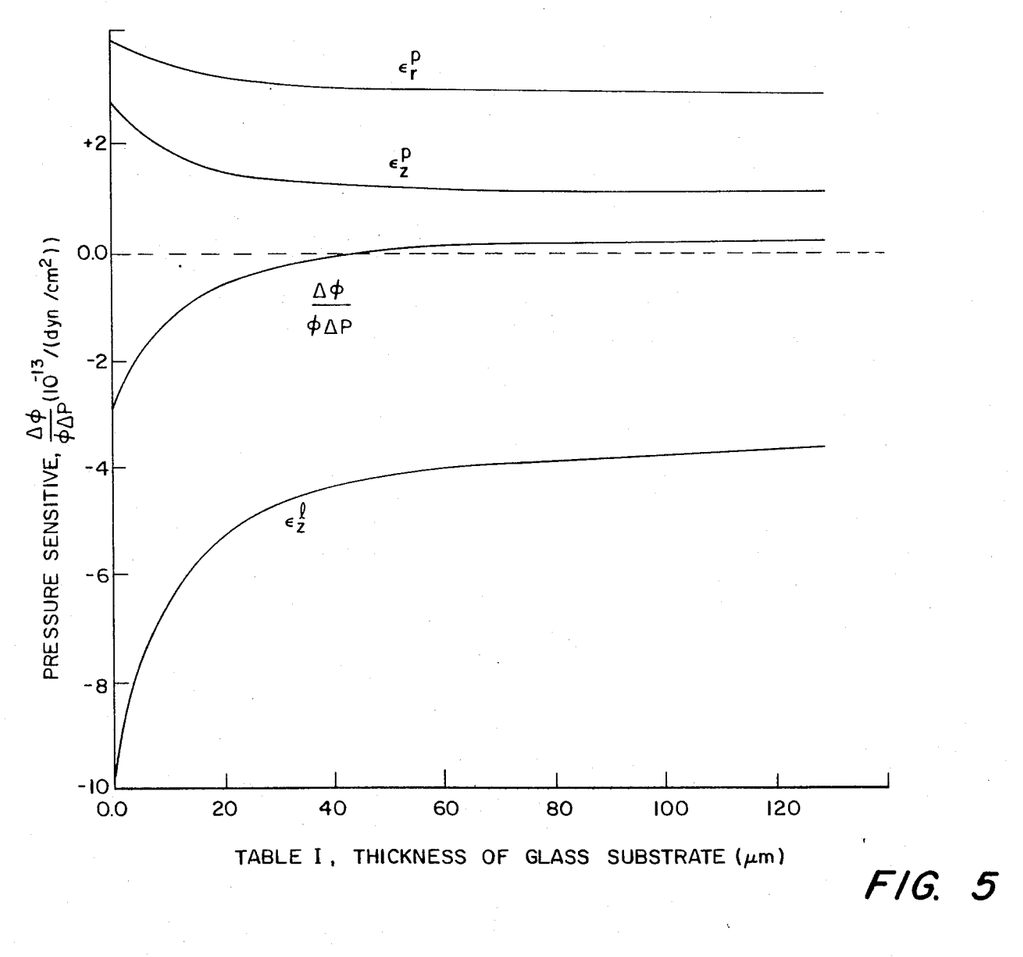
FIG. 5 shows pressure sensitivity of a commercially available optical fiber versus thickness of a calcium aluminate substrate.

FIG. 5 shows the pressure sensitivity ($\Delta\phi/\phi\Delta P$) of such a fiber as a function of the thickness of the substrate glass (calcium aluminate), which in this case has been substituted for soft silicone as first coating D. The second coating E is silicone of 400 microns o.d. substituted for "Hytrel" which normally defines the outer coating. As can be seen in FIG. 5, the sensitivity of the uncoated ITT fiber is about $-0.3 \times 10^{-12}/(dyn/cm^2)$. As the thickness of the calcium aluminate substrate increases the fiber waveguide sensitivity decreases rapidly, and at about 56 μm substrate thickness, it becomes pressure insensitive. Further increase in the substrate thickness results only in a slow change in sensitivity. In the above example, the calcium aluminate substrate is applied immediately outwardly of the original SiO$_2$ substrate of Table I and replaces the soft silicon first coating D. Soft silicon then replaces "Hytrel" as outer coating E. Such a composite can be made from commercially available uncoated ITT high silica fibers (Table I) by dip coating them in low melting temperature calcium aluminate glass. Thereafter, they can be further coated on a line with soft materials like silicone without substantial alteration of the fibers sensitivity. We point out, however, that such a fiber might be fragile since the substrate will be under tension due to the fact that it has a higher expansion coefficient than silica. The fiber can be made stress free by coating the high silica fiber with the high bulk modulus glass using the low temperature gel glass method. This, however, is a slower and more expensive process than the usual fiber drawing process. Alternatively, glasses high in SiO$_2$, T$_i$O$_2$, N, etc., have small expansion coefficients, while glasses high in N, Ca, Al, etc., have high bulk modulus. Thus, a careful choice of the glass composition should give glasses with high bulk modulus and low expansion coefficient.

Figure 6:
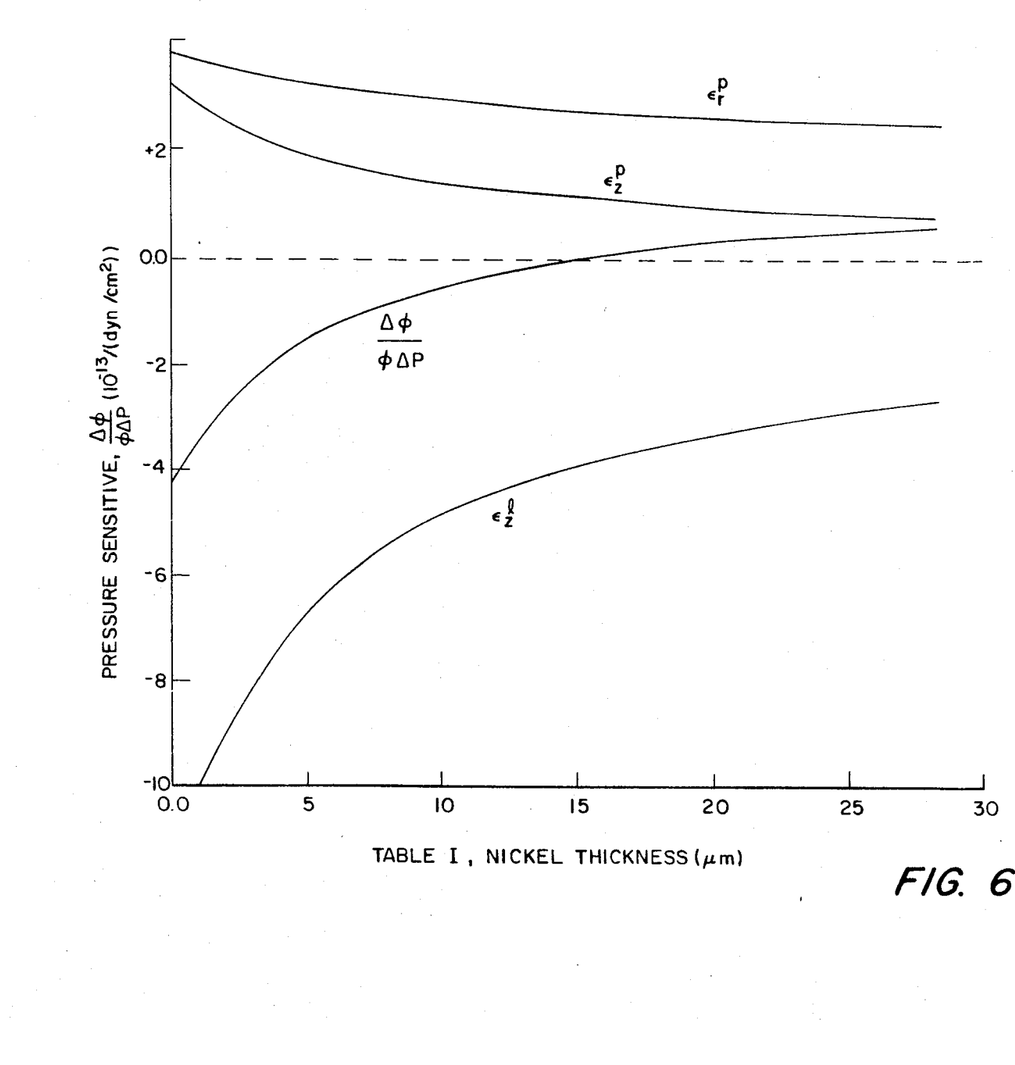
FIG. 6 shows pressure sensitivity of the same commercially available optical fiber versus thickness of a nickel substrate.

FIG. 6 shows pressure sensitivity of the fiber as a function of a metal coating. The fiber is the uncoated ITT high silica fiber of Table I as identified in FIG. 5. The ITT fibers contain the initial SiO$_2$ substrate over which a nickel coating D is applied. The second or outer coating E in this case is "Hytrel" having a 100 μm o.d. As shown in FIG. 6, as the nickel thickness increases, the fiber sensitivity decreases rapidly, and at 15.5 μm thickness the fiber becomes pressure insensitive. Further increase in the coating thickness results in fairly rapid change in fiber sensitivity when compared with the results in FIG. 5. Therefore, the thickness of a nickel substrate has to be closer to the critical thickness than a calcium aluminate substrate to render the fiber substantially insensitive.

Figure 7:
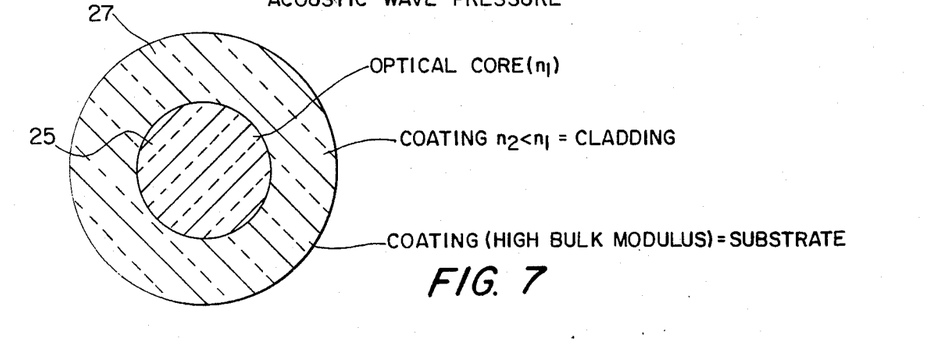
FIG. 7 is a cross-sectional view of an alternate pressure insensitive waveguide.

A relatively simple alternate arrangement may be employed for providing a pressure insensitive waveguide. Such is illustrated in the cross-sectional view of FIG. 7. Optical core 25 is provided with a concentrically surrounding covering 27 which has an index of refraction (n$_2$) slightly less than that of the core (n$_1$), and a bulk modulus substantially higher than that of the core (e.g., around 90–125×10$^{10}$ dyn/cm versus 55–75×10$^{10}$ dyn/cm). The single layer 27 thereby establishes both a cladding and a substrate for optical core 25. As a cladding, its wall thickness is relatively immaterial. As a substrate, its wall thickness may be selected such that, in response to external pressure thereon, it induces in the optical core mutually self cancelling phase shift effects on light in passing therethrough. Core 25 may be any of a variety of light transmitting material, e.g., doped silica or K$_2$O-SiO$_2$ and the substrate may include several materials having the specified refractive index and bulk modulus, e.g., calcium aluminate.

Finally, it should be recognized that in addition to the high bulk modulus glass substrate, there are a number of ceramic materials having high bulk modulus which can be utilized for forming the substrate to achieve desensitized fibers. Such ceramic products are commercially available, for example 3M alumina fiber, Youngs modulus 158×10$^{10}$ (dyn/cm$^2$); DuPont alumina fiber FP, Youngs modulus 347×10$^{10}$ (dyn/cm$^2$); and, Sumitomo alumina fiber, Youngs modulus 289×10$^{10}$ (dyn/cm$^2$). These values may be readily converted into bulk modulus.

Accordingly, an optical fiber can be made pressure insensitive by concentrically surrounding the core and cladding (waveguide) with a high bulk modulus glass substrate as disclosed herein. The core and cladding glass may have a conventional high silica composition (Table I) or a relatively low bulk modulus composition (Table II). For fibers having a high silica content core the substrate glass must have a low expansion coefficient in addition to a high bulk modulus.

There have been disclosed arrangements for rendering an optical fiber insensitive to acoustic pressure such as hydrostatic pressure. Several embodiments have been disclosed to this end. It is obvious that various changes and modifications may be made thereto without departing from the spirit of the invention which is limited only by the scope of the claims annexed hereto.

What is claimed and desired to be secured by Letters Patent of the United States is:

1. A pressure insensitive optical fiber waveguide comprising:
   a solid cylindrical light transmitting core;
   a cladding layer concentrically surrounding the core;
   substrate means concentrically surrounding the cladding layer including a layer of glass having a bulk modulus substantially higher than that of the core;
   said glass layer having a thickness such that external acoustic pressures thereon induce self cancelling phase shifts of light through the core;
   thereby rendering the waveguide substantially insensitive to environmental acoustic conditions.

2. The invention according to claim 1 further defined by a relatively soft coating concentrically surrounding the substrate.

3. A pressure insensitive optical fiber waveguide comprising:
   an optical fiber including an optical core and concentric cladding;
   a substrate concentrically surrounding the optical fiber and having a bulk modulus greater than that of the optical fiber;
   said substrate having a wall thickness such that external acoustic pressures thereon induce self cancelling phase shifts of light through the core;
   thereby rendering the waveguide insensitive to environmental acoustic conditions.

4. The invention according to claim 3 further defined by the substrate wall thickness selected such that the algebraic sum of $\epsilon_z^l + \epsilon_r^P + \epsilon_z^P = 0$, where $$\epsilon_z^l = \epsilon_z, \epsilon_r^P = \frac{-n^2}{2}(P_{11} + P_{12})\epsilon_r, \text{ and } \epsilon_z^P = \frac{-n^2}{2} P_{12}\epsilon_z,$$

$\epsilon_z$ and $\epsilon_r$ being the longitudinal and radial strain respectively of the core induced by acoustic pressure, n being the refractive index of the core, and P$_{11}$ and P$_{12}$ being the elasto-optic or Pockels coefficients of the core.

5. The invention according to claim 3 further defined by the substrate wall thickness being such that a given acoustic hydrostatic pressure exerted on the optical core cancels strains and dimension changes whereby no phase shift is induced in light passing through the core.

6. The invention according to claim 3, 4, or 5 wherein the optical core and cladding comprises $K_2O\text{-}SiO_2$.

7. The invention according to claim 6 further defined by a substrate comprising calcium aluminate.

8. The invention according to claim 6 wherein the glasses have slightly different molar ratios whereby the cladding glass has an index of refraction slightly less than that of the core glass.

9. The invention according to claim 8 wherein the molar ratios are 12-88 for the core and 10-90 for the cladding.

10. The invention according to claim 3, 4, or 5 wherein the substrate is metal.

11. The invention according to claim 10 wherein the metal is nickel.

12. A pressure insensitive optical fiber waveguide comprising;
    an optical fiber core and a concentrically surrounding covering;
    said covering having an index of refraction slightly lower than that of the core thereby defining a cladding;
    said covering further having a bulk modulus substantially higher than that of the core thereby further defining a substrate;
    said covering having a wall thickness such that acoustic pressures thereon induce mutually cancelling phase shifts in light passing through the core;
    thereby rendering the waveguide insensitive to acoustic pressures.

13. The invention according to claim 12 wherein the substrate wall thickness is such that the algebraic sum of $\epsilon_z^l + \epsilon_r^P + \epsilon_z^P = 0$ where $$\epsilon_z^l = \epsilon_z, \quad \epsilon_r^P = \frac{-n^2}{2}(P_{11} + P_{12})\epsilon_r, \text{ and } \epsilon_z^P = \frac{-n^2}{2} P_{12}\epsilon_z,$$

$\epsilon_z$ and $\epsilon_r$ being the longitudinal and radial strain respectively, of the core induced by acoustic pressure, n being the refractive index of the core, and $P_{11}$ and $P_{12}$ being the elasto-optic or Pockels coefficients of the core.

14. The invention according to claim 13 further defined by the core being $K_2O\text{-}SiO_2$.

15. The invention according to claim 13 or 14 further defined by the covering being selected from the group consisting of calcium aluminate and high bulk modulus ceramic material.

16. In an optical fiber waveguide including a glass core and cladding with a glass substrate disposed concentrically about the cladding, an improved process comprising:
    applying an additional substrate of high bulk modulus glass concentrically about said initial glass substrate; and
    selecting a wall thickness for the high bulk modulus glass such that acoustic pressures thereon induce the algebraic sum of $\epsilon_z^l + \epsilon_r^P + \epsilon_z^P = 0$ where $$\epsilon_z^l = \epsilon_z, \quad \epsilon_r^P = \frac{-n^2}{2}(P_{11} + P_{12})\epsilon_r, \text{ and } \epsilon_z^P = \frac{-n^2}{2} P_{12}\epsilon_z,$$

$\epsilon_z$ and $\epsilon_r$ being the longitudinal and radial strain, respectively, of the core induced by acoustic pressure, n being the refractive index of the core, and $P_{11}$ and $P_{12}$ being the elasto-optic or Pockels coefficients of the core;
    whereby light in passing through the optical core is immune from pressure induced phase shifts.

* * * * *